(12) United States Patent
Sung et al.

(10) Patent No.: US 12,365,300 B2
(45) Date of Patent: Jul. 22, 2025

(54) SEATBELT AIRBAG

(71) Applicants: Hyundai Motor Company, Seoul (KR); Kia Corporation, Seoul (KR); Hyundai Mobis Co., Ltd., Seoul (KR)

(72) Inventors: Il Chang Sung, Hwaseong-si (KR); Seok Hoon Ko, Yongin-si (KR); Min June Song, Seoul (KR)

(73) Assignees: Hyundai Motor Company, Seoul (KR); Kia Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/411,687

(22) Filed: Jan. 12, 2024

(65) Prior Publication Data
US 2025/0065837 A1    Feb. 27, 2025

(30) Foreign Application Priority Data
Aug. 23, 2023   (KR) .................. 10-2023-0110737

(51) Int. Cl.
*B60R 21/18* (2006.01)
*B60R 21/00* (2006.01)
(Continued)

(52) U.S. Cl.
CPC ............ *B60R 21/18* (2013.01); *B60R 21/233* (2013.01); *B60R 21/2338* (2013.01);
(Continued)

(58) Field of Classification Search
CPC ... B60R 21/18; B60R 21/233; B60R 21/2338; B60R 21/239; B60R 21/261; B60R 21/262; B60R 21/01554; B60R 2021/0039; B60R 2021/0048; B60R 2021/01211; B60R 2021/2612
See application file for complete search history.

(56) References Cited

U.S. PATENT DOCUMENTS 6,957,828 B2 * 10/2005 Keeslar .................. B60R 21/18
                                                              280/730.2
7,597,355 B2 * 10/2009 Williams ............ B60R 21/2338
                                                              280/739
(Continued)

FOREIGN PATENT DOCUMENTS

KR       20220000128 A    1/2022
KR       20240076256 A    5/2024

*Primary Examiner* — Timothy Wilhelm
(74) *Attorney, Agent, or Firm* — Slater Matsil, LLP

(57) ABSTRACT

An embodiment seatbelt airbag includes a diaphragm configured to divide an internal space of an airbag cushion in a deployed state into a first chamber and a second chamber, the airbag cushion being configured to be deployed from a seatbelt, a first support part disposed at a lower side of the first chamber, wherein the first support part has a first shape that widens toward a front side of a passenger and is configured to be supported on thighs of the passenger, a second support part disposed at an upper side of the second chamber, wherein the second support part has a second shape that widens toward the passenger and is configured to support a head of the passenger, and a deployment adjustment device configured to adjust an operation of deploying the first chamber and the second chamber in accordance with a seat arrangement.

20 Claims, 15 Drawing Sheets

(51) Int. Cl.
  *B60R 21/01* (2006.01)
  *B60R 21/015* (2006.01)
  *B60R 21/233* (2006.01)
  *B60R 21/2338* (2011.01)
  *B60R 21/239* (2006.01)
  *B60R 21/261* (2011.01)
  *B60R 21/262* (2011.01)

(52) U.S. Cl.
  CPC .......... *B60R 21/239* (2013.01); *B60R 21/261* (2013.01); *B60R 21/262* (2013.01); *B60R 2021/0039* (2013.01); *B60R 2021/0048* (2013.01); *B60R 2021/01211* (2013.01); *B60R 21/01554* (2014.10); *B60R 2021/2612* (2013.01)

(56) References Cited

U.S. PATENT DOCUMENTS

| | | | | |
|---|---|---|---|---|
| 7,938,445 B2* | 5/2011 | Smith | .................... | B60R 21/239 280/743.2 |
| 7,946,613 B2* | 5/2011 | Rose | .................... | B60R 21/239 280/729 |
| 8,657,330 B1* | 2/2014 | Choi | .................... | B60R 21/233 280/736 |
| 8,684,401 B2* | 4/2014 | Shibayama | ........... | B60R 21/233 280/730.2 |
| 9,428,134 B2* | 8/2016 | Hiraiwa | ................. | B60R 21/233 |
| 9,517,744 B2* | 12/2016 | Shimazu | ................. | B60R 21/18 |
| 9,555,763 B2* | 1/2017 | Goertz | ................... | B60R 21/239 |
| 10,099,645 B2* | 10/2018 | Song | .................... | B60R 21/207 |
| 11,066,033 B2* | 7/2021 | Goswami | .............. | B60R 21/232 |
| 11,242,024 B2* | 2/2022 | Aki | .................... | B60R 21/23138 |
| 11,390,232 B2* | 7/2022 | Fischer | ................. | B60N 2/0025 |
| 11,691,586 B2* | 7/2023 | Fischer | ................. | B60R 21/233 280/733 |
| 11,851,019 B2* | 12/2023 | Sung | .................... | B60R 21/239 |
| 12,017,599 B2* | 6/2024 | Sung | .................... | B60R 21/2346 |
| 12,036,938 B2* | 7/2024 | Matsuzaki | ........... | B60R 21/233 |
| 2009/0278340 A1* | 11/2009 | Azuma | ................ | B60R 21/0134 280/733 |
| 2013/0264803 A1* | 10/2013 | Schneider | ............. | B60R 21/18 280/733 |
| 2015/0069741 A1* | 3/2015 | Shimazu | ................ | B60R 21/233 280/729 |
| 2017/0225788 A1* | 8/2017 | Humbert | ............... | B60R 21/233 |
| 2018/0086302 A1* | 3/2018 | Hiraiwa | ................ | B60R 21/207 |
| 2018/0290615 A1* | 10/2018 | Humbert | .......... | B64D 11/06205 |
| 2019/0299899 A1* | 10/2019 | Einarsson | ............. | B60R 21/233 |
| 2021/0094496 A1* | 4/2021 | Tanaka | ................... | B60R 21/20 |
| 2021/0300277 A1* | 9/2021 | Fukaura | ................ | B60R 21/18 |
| 2022/0355755 A1* | 11/2022 | Fischer | ................ | B60R 21/2338 |
| 2024/0059240 A1* | 2/2024 | Matsuzaki | ........... | B60R 21/237 |
| 2024/0166154 A1 | 5/2024 | Sung et al. | | |

* cited by examiner

SEATBELT AIRBAG

CROSS-REFERENCE TO RELATED APPLICATIONS

This application claims the benefit of Korean Patent Application No. 10-2023-0110737, filed on Aug. 23, 2023, which application is hereby incorporated herein by reference.

TECHNICAL FIELD

The present disclosure relates to a seatbelt airbag.

BACKGROUND

An airbag operates to absorb an impact applied to a passenger's body and restrain a motion of the passenger's body by filling an airbag cushion with high-pressure gas generated by an inflator in the event of a vehicle collision.

An airbag module includes the inflator configured to generate gas, the airbag cushion configured to restrain and protect the passenger by being filled with gas, and a housing or mounting plate configured to accommodate and fix the inflator and the airbag cushion.

The airbag module is installed on a part, such as an armature of a steering wheel or cowl cross bar, to which the airbag module may be sufficiently securely fixed.

However, because an installation space for the airbag and a deployment route for the cushion need to be ensured, there is a problem in that a degree of freedom related to an interior design deteriorates.

In addition, it is difficult to not only cope with changes in interior structures, seated postures, and seat positions, but also ensure excellent protection performance in various situations because protection regions greatly vary depending on a driver's gender, age, and body condition.

The foregoing explained as the background is intended merely to aid in the understanding of the background of embodiments of the present disclosure and is not intended to mean that embodiments of the present disclosure fall within the purview of the related art that is already known to those skilled in the art.

SUMMARY

The present disclosure relates to a seatbelt airbag. Particular embodiments relate to a seatbelt airbag that ensures a protection region for a passenger by adjusting a deployment shape of an airbag cushion deployed from a seatbelt in accordance with a seat arrangement.

Embodiments of the present disclosure can solve problems in the art and provide a seatbelt airbag that ensures a protection region for a passenger by adjusting a deployment shape of an airbag cushion deployed from a seatbelt in accordance with a seat arrangement.

An embodiment of the present disclosure provides a seatbelt airbag including a diaphragm configured to divide an internal space of an airbag cushion, which is configured to be deployed from a seatbelt, into a first chamber and a second chamber, a first support part provided at a lower side of the first chamber, formed in a shape widened toward a front side of a passenger, and supported on the passenger's thighs, a second support part provided at an upper side of the second chamber, formed in a shape widened toward the passenger, and configured to support the passenger's head, and a deployment adjustment device configured to adjust an operation of deploying the first and second chambers in accordance with a seat arrangement.

The first support part may be formed such that a bottom surface of the first chamber is widened leftward and rightward toward the front side of the passenger in a passenger direction.

The second support part may be formed such that an upper surface of the second chamber is widened leftward and rightward toward the passenger from a location in front of the passenger.

The diaphragm may divide the internal space in an oblique shape between a front end of the first support part and a rear end of the second support part.

Two opposite sides of the diaphragm may be fixed to edges at which rear lateral regions extending upward from two opposite sides of the first support part meet front lateral regions extending downward from two opposite sides of the second support part.

A portion between the diaphragm and the front end of the first support part and a portion between the diaphragm and the rear end of the second support part may be configured such that a flow rate of gas passing therethrough is less than a predetermined flow rate.

The deployment adjustment device may include first and second inflators configured to independently supply gas into the first and second chambers and a controller configured to perform control to selectively operate the first and second inflators in accordance with a seat position.

A diffuser, which communicates with the first chamber, may be provided in a gas inlet port of the airbag cushion, such that the gas of the first inflator is introduced into the first chamber through the diffuser, and a gas hose, which communicates with the second chamber, may be provided in the gas inlet port of the airbag cushion, such that the gas of the second inflator is introduced into the second chamber through the gas hose.

A discharge port, which communicates with the first chamber, may be provided in the diffuser, and the gas hose may penetrate the diffuser and be connected to communicate with the second chamber.

In response to a signal from a seat position sensor, the controller may perform control to operate the first inflator when a leg protection condition for a passenger is satisfied, and the controller may perform control to operate the second inflator when a head protection condition for the passenger is satisfied.

The deployment adjustment device may include an active vent formed in a hole shape in the diaphragm, a tether having one end connected to the active vent, the tether being configured to close the active vent when tension is applied as the tether is pulled in a direction in which the airbag cushion is deployed when the airbag cushion is deployed, an active actuator connected to the other end of the tether and configured to apply tension to the tether and eliminate the tension by operating to be disconnected from the tether, and a controller configured to perform control to selectively operate the active actuator in accordance with a seat position.

The tether may be wound around a rim of the active vent, and the tension applied to the tether may allow the tether to tighten the rim of the active vent to close the active vent.

A diffuser may be fixed to an inner surface of a gas inlet port of the airbag cushion, a heat shield may be fixed to an inner surface of the diffuser, a slit may be formed in the diffuser overlapping the heat shield, and the tether may be connected by passing through a portion between the heat shield and the diffuser and passing through the slit.

A distance between an end of the heat shield and the slit may be equal to or longer than a predetermined length.

An inflator, the heat shield, and the diffuser may be bound by a fastener, and the slit may be formed between a fixing point, at which the gas inlet port and the diffuser are fixed, and a binding point of the fastener.

In response to a signal of a seat position sensor, the controller may perform control not to operate the active actuator when a leg protection condition for a passenger is satisfied, and the controller may perform control to operate the active actuator when a head protection condition for the passenger is satisfied.

The deployment adjustment device may include an active vent formed in a hole shape in the diaphragm, a tether having one end connected to the active vent, the tether being configured to be pulled in a direction in which the airbag cushion is deployed when the airbag cushion is deployed, and a tether fixing part to which the other end of the tether is fixed at ordinary times, the tether fixing part being configured not to be changed in position when a seat arrangement is changed. A marginal length of the tether extending from the tether fixing part to the active vent may be a length by which the tether is pulled to close the active vent at the time of switching to a seat arrangement that satisfies a leg protection condition for passenger, and the marginal length of the tether may be a length by which an open state of the active vent is maintained even though the tether is pulled at the time of switching to a seat arrangement that satisfies a head protection condition for passenger.

According to the above-mentioned technical solutions of embodiments of the present disclosure, the airbag cushion is deployed while varying whether to deploy the first chamber and the second chamber and the deployment timing of the first chamber and the second chamber, which are divided based on the forward/rearward direction of the airbag cushion, depending on the seat arrangement. Therefore, the airbag cushion may be deployed in a shape optimized for a collision situation, and the passenger protection region may be stably ensured.

Moreover, the first chamber is deployed in a shape widened toward the front side of the passenger, such that the airbag cushion is supported on the passenger's thighs, and the passenger's upper body is stably restrained. In addition, the second chamber is deployed in a shape widened toward the passenger, such that the range in which the passenger's head is supported is increased, and the passenger is safely protected.

DETAILED DESCRIPTION OF ILLUSTRATIVE EMBODIMENTS

Figure 1:
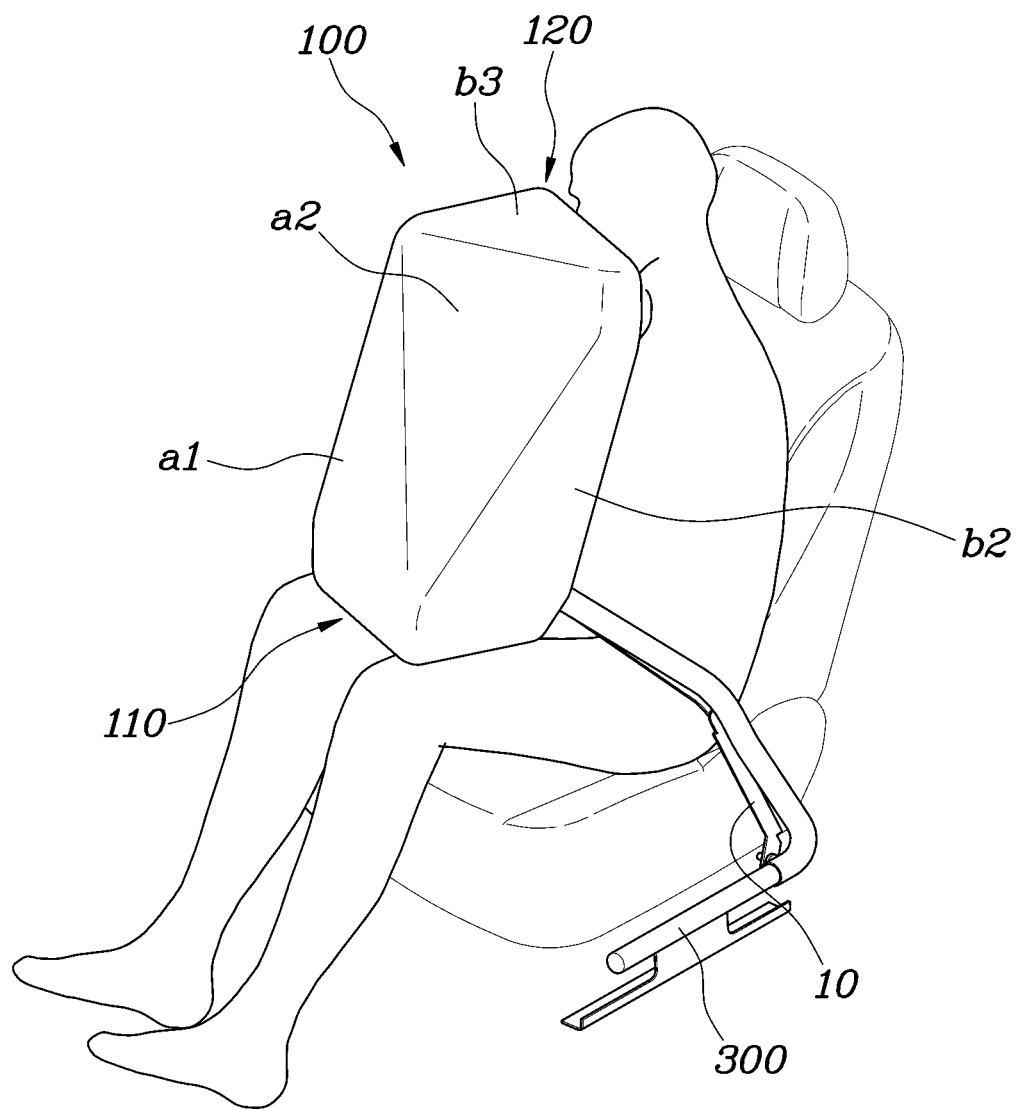
FIG. 1 is a view illustrating a state in which an airbag cushion is deployed in a state in which a passenger is seated in a seat according to an embodiment of the present disclosure.

Hereinafter, embodiments disclosed in the present specification will be described in detail with reference to the accompanying drawings. The same or similar constituent elements are assigned with the same reference numerals regardless of figure numbers, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as having different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

A controller may include a communication device configured to communicate with another controller or a sensor to control a corresponding function, a memory configured to store an operating system, a logic command, and input/output information, and one or more processors configured to perform a determination, computation, decision, or the like required to control the corresponding function.

Hereinafter, exemplary embodiments of the present disclosure will be described in detail with reference to the accompanying drawings.

A seatbelt airbag of embodiments of the present disclosure includes a diaphragm 200 configured to divide an internal space of an airbag cushion 100, which is configured to be deployed from a seatbelt 10, into a first chamber 100a and a second chamber 100b, a first support part 110 formed in a shape widened from a lower side of the first chamber 100a toward a front side of a passenger and configured to be supported on the passenger's thighs, a second support part 120 formed in a shape widened from an upper side of the second chamber 100b toward the passenger and configured to support the passenger's head, and a deployment adjustment device configured to adjust an operation of deploying the first chamber 100a and the second chamber 100b in accordance with a seat arrangement.

Figure 2:
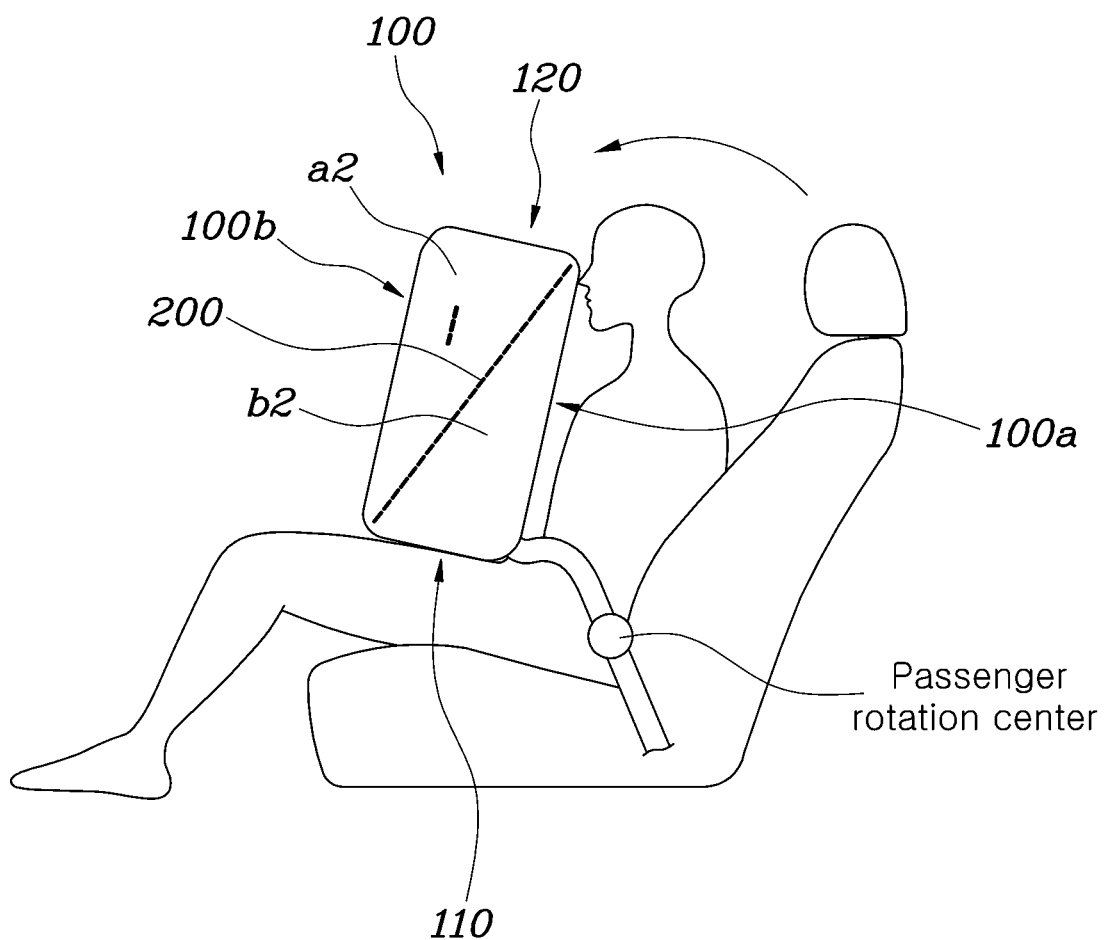
FIG. 2 is a view illustrating the configuration in FIG. 1 when viewed from the lateral side.
Figure 3:
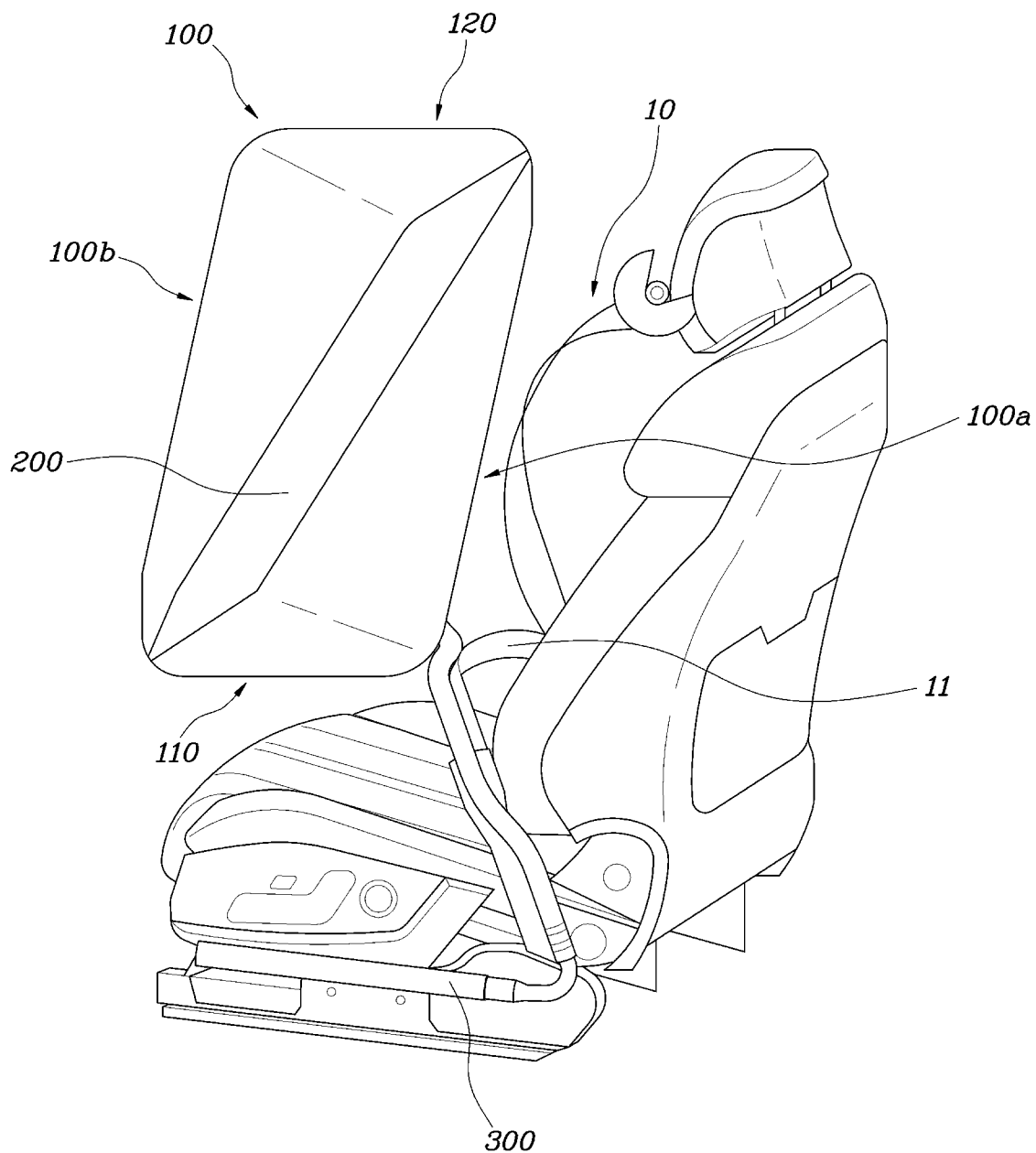
FIG. 3 is a view illustrating a state in which a diaphragm is installed in an airbag cushion divided into first and second chambers according to an embodiment of the present disclosure.

With reference to FIGS. 1 to 3, in a seat arrangement in an opposite-seating state in which passengers face one another, there is no structure on which airbags are installed in front of the passengers. Therefore, it is necessary to protect the passengers by deploying the airbag cushion 100 at a location in front of the passenger.

In addition, in a seat arrangement in which a partition wall is positioned in front of a passenger, it is necessary to deploy the airbag cushion 100 having a sufficient volume between the passenger and the partition wall to protect the passenger and prevent the passenger from strongly colliding with the partition wall.

Therefore, in embodiments of the present disclosure, the airbag cushion 100 is configured to be deployed from a wrap webbing 11 of the seatbelt 10 that surrounds the passenger's waist. The airbag cushion 100 is deployed in front of the passenger and protects the passenger.

The internal space of the airbag cushion 100 is divided into front and rear spaces by the diaphragm 200. Therefore, the first chamber 100a is formed at the rear side of the airbag cushion 100, and the second chamber 100b is formed at the front side of the airbag cushion 100.

In particular, the airbag cushion 100 is deployed in a shape in which the lower side of the first chamber 100a is widened toward the front side of the passenger, and the portion of the airbag cushion 100, which is deployed widely, is supported on the passenger's thighs.

Therefore, the airbag cushion 100 is prevented from exiting between the legs of the passenger, thereby safely protecting the passenger in the seat arrangement in the opposite-seating state.

Further, the upper side of the second chamber 100b is deployed in a shape widened toward the passenger, and the portion of the airbag cushion 100, which is deployed widely, supports the passenger's head, thereby protecting the passenger.

Because the main protection regions for the passenger vary depending on the seat arrangements as described above, it is necessary to provide the passenger with protection performance appropriate for a collision situation.

Therefore, the first chamber 100a is deployed prior to the deployment of the second chamber 100b in a seat arrangement that satisfies a leg protection condition for the passenger, and the second chamber 100b is deployed prior to the deployment of the first chamber 100a in a seat arrangement that satisfies a head protection condition for the passenger, such that the airbag cushion 100 may be appropriately deployed in a collision situation, thereby safely protecting the passenger.

In the present disclosure, the first support part 110 may be formed such that a bottom surface of the first chamber 100a is formed to be widened leftward and rightward toward the front side of the passenger in the passenger direction.

With reference to FIGS. 1 and 3, the first support part 110 provided on the bottom surface of the first chamber 100a is supported on the passenger's thighs.

Specifically, in the event of a collision, the passenger's body is primarily restrained by the seatbelt 10.

That is, the passenger's upper body rotates forward about the pelvis close to the center of gravity of the passenger's body, such that the rotational motion of the passenger's upper body is restrained by the airbag cushion 100.

In this case, in order to restrain the passenger's upper body, the airbag cushion 100 needs to provide a sufficient supporting force but should not sway leftward and rightward nor lose a restrictive force.

In particular, because the passenger's knees may open in the event of a collision, the bottom surface of the airbag cushion 100 may be formed in a shape widened as the distance from the pelvis increases forward.

Therefore, according to embodiments of the present disclosure, the bottom surface of the first chamber 100a is deployed widely toward the knee, such that the airbag cushion 100 is prevented from exiting between the knees or swaying leftward and rightward. Further, the airbag cushion 100 provides a restrictive force at the portion distant from the rotation center, thereby providing a stronger supporting force.

Further, the second support part 120 is formed such that an upper surface of the second chamber 100b is widened leftward and rightward toward the passenger from the location in front of the passenger, thereby supporting the passenger's head.

Specifically, in case that a collision occurs in a state in which a structure is positioned in front of the passenger, there is a great risk that the passenger's upper body rotates, and the passenger's head collides with the structure. Therefore, the airbag cushion 100 needs to be deployed in a space between the structure and the passenger's head in order to prevent the collision between the structure and the passenger's head.

Therefore, the front and rear lengths of the airbag cushion 100 are maintained, and the rear surface of the airbag cushion 100, which is configured to come into contact with the passenger's head, is formed to be widened leftward and rightward. Therefore, the airbag cushion 100 may stably restrain the passenger's head even though the passenger's upper body partially sways leftward and rightward.

Further, the airbag cushion 100 is formed to be narrowed leftward and rightward toward the front side of the passenger in the passenger direction, such that the sufficient protection region is provided, and the overall volume of the airbag cushion 100 is reduced.

Therefore, the size of the airbag cushion 100 is reduced, such that the deterioration in wearing comfort of the seatbelt 10 may be prevented, and a capacity of an inflator 300 may be reduced in the state in which the airbag cushion 100 is accommodated in the seatbelt 10.

Meanwhile, in embodiments of the present disclosure, the diaphragm 200 may divide the internal space in an oblique shape between the front end of the first support part 110 and the rear end of the second support part 120.

That is, as illustrated in FIG. 2, an upper end of the diaphragm 200 adjusts a rear end edge of the second support part 120 that supports the passenger's head, and a lower end of the diaphragm 200 adjoins a front end edge of the first support part 110 that is supported on the passenger's knees.

Therefore, the diaphragm 200 may extend to be inclined from a front lower end toward a rear upper end in the airbag cushion 100 and divide the internal space of the airbag cushion 100.

Further, two opposite sides of the diaphragm 200 may be fixed to edges at which rear lateral regions b2 extending upward from two opposite sides of the first support part 110 meet front lateral regions a2 extending downward from two opposite sides of the second support part 120.

Figure 4:
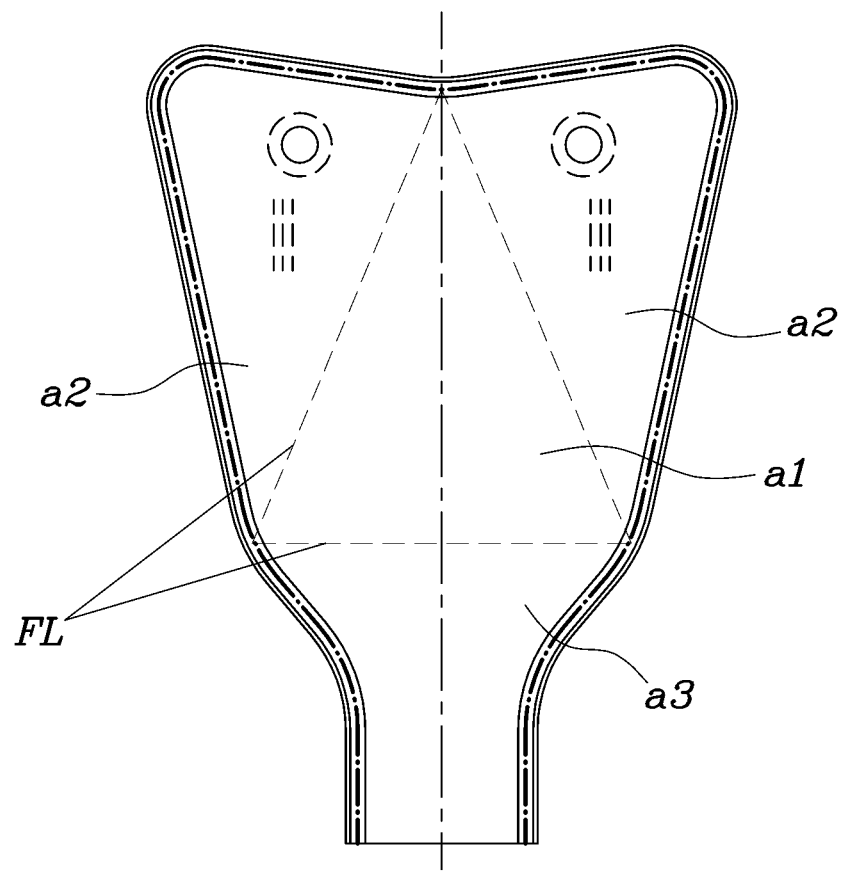
FIGS. 4 and 5 are views illustrating first and second panels of the airbag cushion of an embodiment of the present disclosure.
Figure 5:
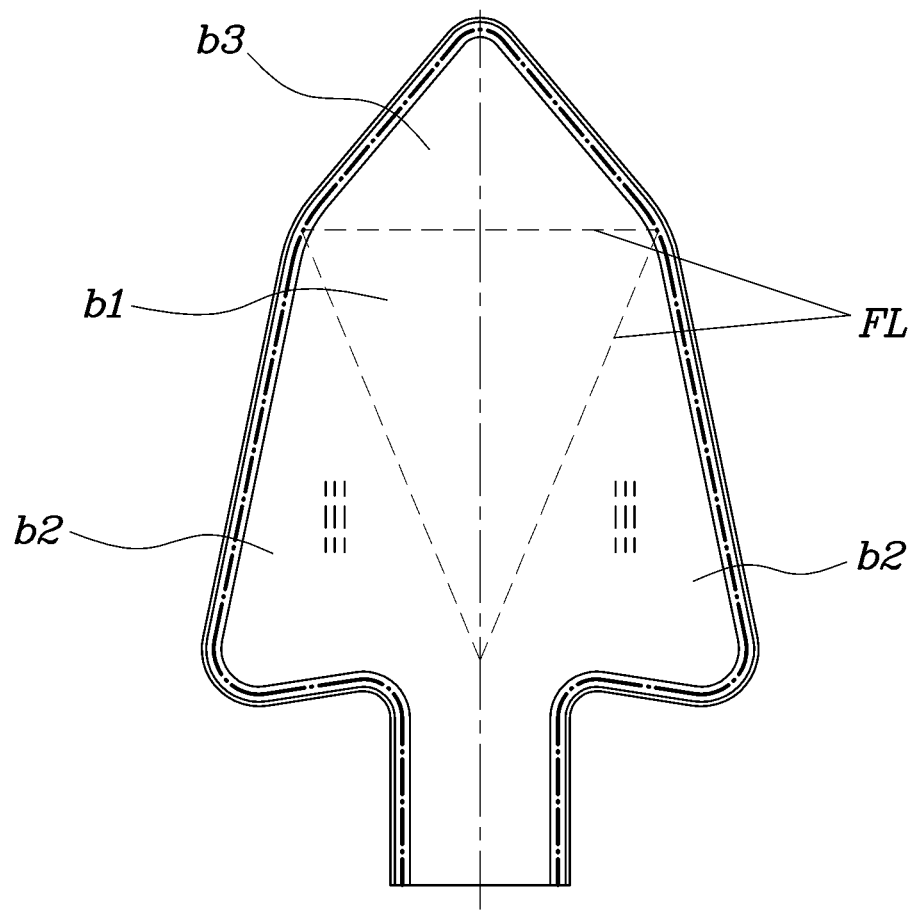

Specifically, with reference to FIGS. 2, 4, and 5, a front region a1 of the airbag cushion 100 directed toward the front side of the passenger is formed in a surface shape of a right-angled triangle, the front lateral regions a2 are respectively connected to left and right hypotenuses of the front region a1, and folding lines FL are formed on the portions where the front region a1 and the front lateral regions a2 are connected, such that the front lateral regions a2 are folded about the folding lines FL with respect to the front region a1.

In addition, a base of a bottom region a3 is connected to a base of the front region a1, and the folding line FL is formed on the portion where the front region a1 and the bottom region a3 are connected, such that the bottom region a3 is folded about the folding line FL with respect to the front region a1.

Further, a rear region b1 of the airbag cushion 100 directed toward the passenger is formed in a surface shape of an inverted right-angled triangle, the rear lateral regions b2 are respectively connected to left and right hypotenuses of the rear region b1, and the folding lines FL are formed on the portions where the rear region b1 and the rear lateral region b2 are connected, such that the rear lateral regions b2 are folded about the folding lines FL with respect to the rear region b1.

In addition, a base of an upper surface region b3 is connected to a base of the rear region b1, and the folding line FL is formed on the portion where the rear region b1 and the upper surface region b3 are connected, such that the upper surface region b3 is folded about the folding line FL with respect to the rear region b1.

Further, the other hypotenuse of the front lateral region a2 and the other hypotenuse of the rear lateral region b2 are connected by sewing, the bases of the two opposite front lateral regions a2 and two opposite hypotenuses of the upper surface region b3 are connected by sewing, and the bases of the two opposite rear lateral regions b2 and the two opposite hypotenuses of the bottom region a3 are connected by sewing, such that the shape of the airbag cushion 100 is implemented.

In particular, the left and right sides of the diaphragm 200 are respectively sewed along the portion where the other hypotenuse of the front lateral region a2 and the other hypotenuse of the rear lateral region b2 are sewed, such that the diaphragm 200 divides the internal space of the airbag cushion 100 in an oblique line.

Because the diaphragm 200 is sewed when the rear lateral region b2 and the front lateral region a2 are sewed, a sewing process of fixing only the diaphragm 200 is not required.

Further, a portion between the diaphragm 200 and the front end of the first support part 110 and a portion between the diaphragm 200 and the rear end of the second support part 120 are configured such that a flow rate of gas passing therethrough is less than a predetermined flow rate.

That is, the diaphragm 200 is fixed to two opposite sides of the inner surface of the airbag cushion 100 by sewing the two opposite surfaces of the diaphragm 200. However, because the upper and lower ends of the diaphragm 200 are not sewed to the airbag cushion 100, a gap may be formed between the diaphragm 200 and the inner surface of the airbag cushion 100.

Therefore, gas may flow through the gaps at the upper and lower ends of the diaphragm 200.

However, the gaps, which are formed at the upper and lower ends of the diaphragm 200, are formed to be narrowed, such that the flow rate of the gas may be restrictive. In some instances, the upper and lower ends of the diaphragm 200 may be sewed to the inner surface of the airbag cushion in order to ensure sealability.

Meanwhile, as a first embodiment of the deployment adjustment device, the inflator may be used to adjust the operation of deploying the first chamber 100a and the second chamber 100b.

Figure 6:
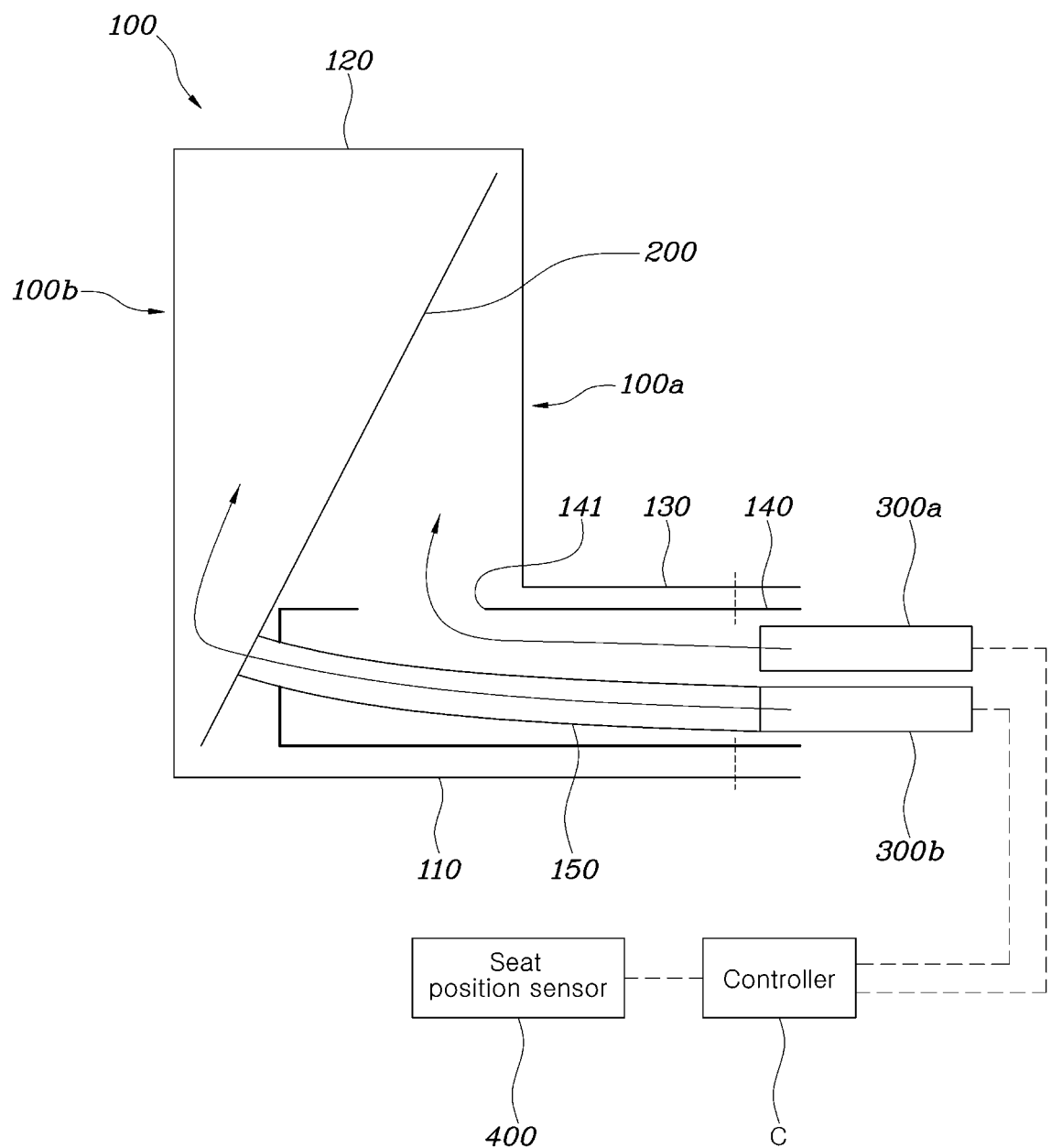
FIG. 6 is a view for explaining an operation of supplying gas into the first and second chambers by first and second inflators according to an embodiment of the present disclosure.
Figure 7:
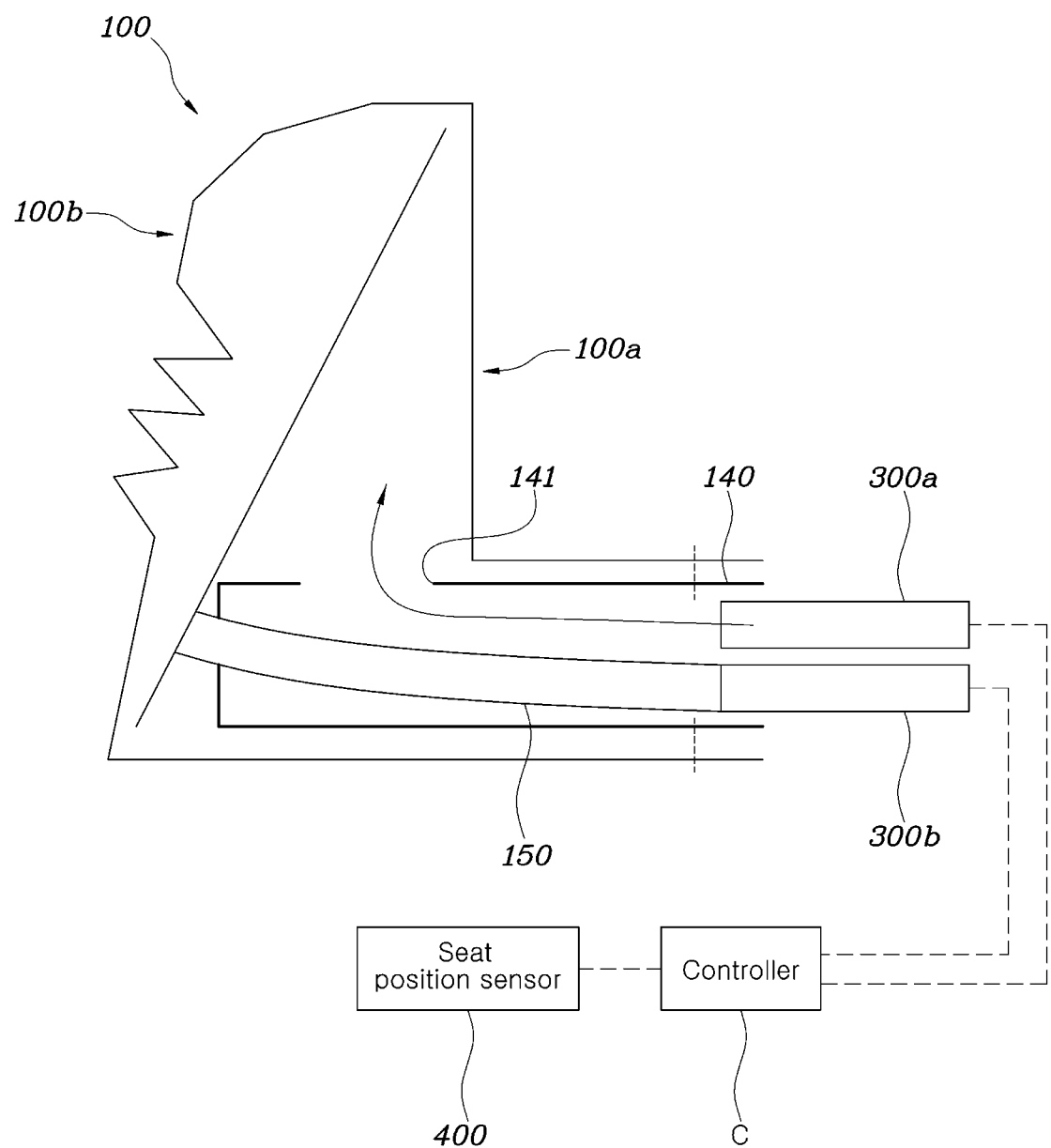
FIG. 7 is a view for explaining an operation of supplying gas into the first chamber by the first inflator according to an embodiment of the present disclosure.
Figure 8:
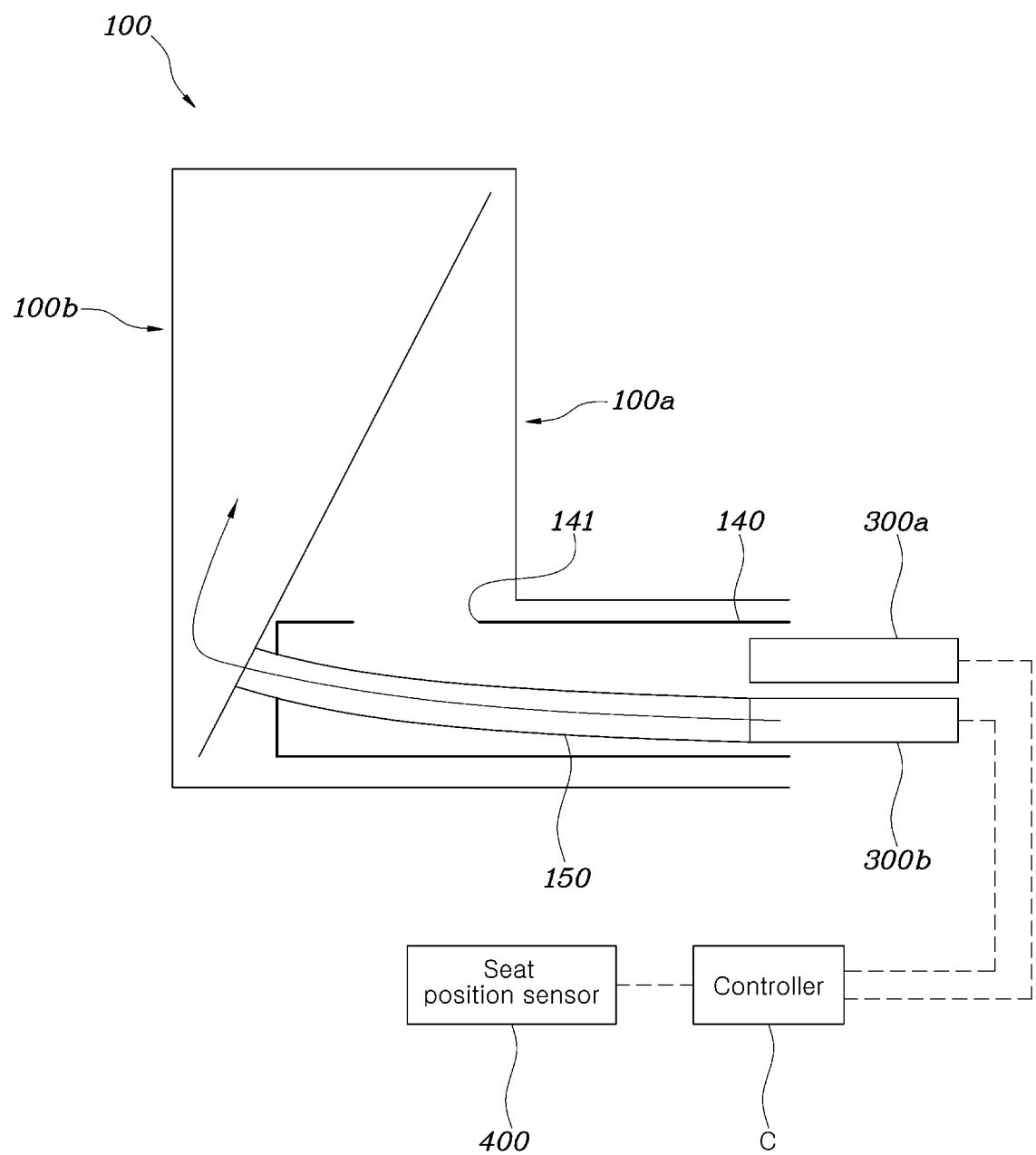
FIG. 8 is a view for explaining an operation of supplying gas into the second chamber by the second inflator according to an embodiment of the present disclosure.

With reference to FIGS. 6 to 8, the deployment adjustment device of an embodiment of the present disclosure includes first and second inflators 300a and 300b configured to independently supply gas to the first and second chambers 100a and 100b and a controller C configured to perform control to selectively operate the first inflator 300a and the second inflator 300b in accordance with the seat position.

For example, the first inflator 300a and the second inflator 300b may provide gas to the first chamber 100a and the second chamber 100b through different routes.

Therefore, the first and second inflators 300a and 300b are simultaneously operated or only one of the first and second inflators 300a and 300b is selected and operated depending on the seat arrangement, such that the order of deploying the first chamber 100a and the second chamber 100b may be adjusted.

Further, a diffuser 140, which communicates with the first chamber 100a, is provided in a gas inlet port 130 of the airbag cushion 100, such that the gas of the first inflator 300a may be introduced into the first chamber 100a through the diffuser 140. A gas hose 150, which communicates with the second chamber 100b, is provided in the gas inlet port 130 of the airbag cushion 100, such that the gas of the second inflator 300b may be introduced into the second chamber 100b through the gas hose 150.

Further, a discharge port 141, which communicates with the first chamber 100a, is provided in the diffuser 140, and the gas hose 150 may penetrate the diffuser 140 and be connected to communicate with the second chamber 100b.

For example, the first inflator 300a and the second inflator 300b may be connected to the diffuser 140.

Further, the discharge port 141 provided in the diffuser 140 is directed toward the airbag cushion 100, and the discharge port 141 is provided to communicate with the first chamber 100a.

Therefore, the gas generated by the first inflator 300a is moved to the diffuser 140 and supplied into the first chamber 100a through the discharge port 141 provided in the diffuser 140.

One end of the gas hose 150 is connected to the second inflator 300b, and the other end of the gas hose 150 penetrates the diffuser 140 and is connected to communicate with the first chamber 100a.

To this end, the other end of the gas hose 150 may be connected to enter the second chamber 100b through a gap formed at the lower end of the partition wall or connected to enter the second chamber 100b by penetrating the partition wall.

Therefore, the gas generated by the second inflator 300b is moved along the gas hose 150 and supplied into the second chamber 100b.

Further, in response to a signal from a seat position sensor 400, the controller C may perform control to operate the first inflator 300a when the leg protection condition for the passenger is satisfied, and the controller C may perform control to operate the second inflator 300b when the head protection condition for the passenger is satisfied.

That is, the seat position sensor 400 may detect a rotation angle of the seat with respect to a 'Z'-axis, such that the seat arrangement in the opposite-seating state in which the passengers face each other and the seat arrangement in which the passenger faces the partition wall may be determined on the basis of a signal detected by the seat position sensor 400.

First, in the seat arrangement in the opposite-seating state in which the passengers face each other, only the first inflator 300a operates, as illustrated in FIG. 7, such that the first chamber 100a is deployed first, and then the gas, which fills the first chamber 100a, is moved to the second chamber 100b, such that the second chamber 100b is deployed.

Therefore, the first chamber 100a is inflated and deployed prior to the second chamber 100b, and particularly, the lower end of the first chamber 100a is deployed in a shape widened toward the front side of the passenger, such that the first support part 110 of the first chamber 100a is supported on the passenger's thighs and stably restrains the passenger's upper body.

Further, in the seat arrangement in which the passenger faces the structure of the vehicle such as the partition wall, only the second inflator 300b operates, as illustrated in FIG. 8, such that the second chamber 100b is deployed first, and then the gas, which fills the second chamber 100b, is moved to the first chamber 100a, such that the first chamber 100a is deployed.

Therefore, the second chamber 100b is inflated and deployed prior to the first chamber 100a, and particularly, the upper end of the second chamber 100b is deployed in a shape widened toward the passenger's head, such that the passenger's head is supported on the second support part 120 of the second chamber 100b, and the passenger's head is safely protected.

Meanwhile, as a second embodiment of the deployment adjustment device, a tether 230 and an active vent 210 may be used to adjust the operation of deploying the first chamber 100a and the second chamber 100b.

Figure 9:
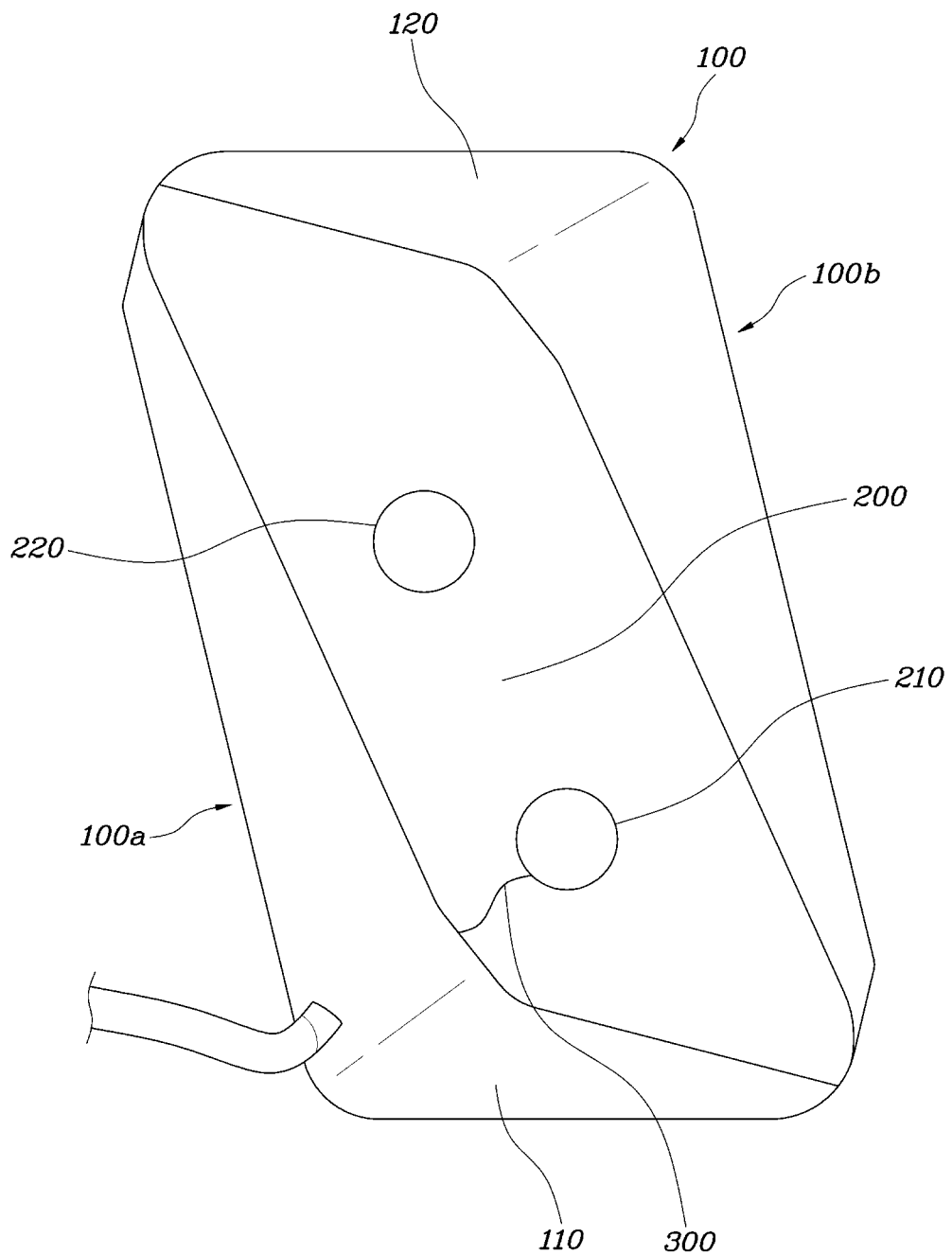
FIG. 9 is a view illustrating a configuration in which an active vent is formed in the diaphragm according to an embodiment of the present disclosure.
Figure 10:
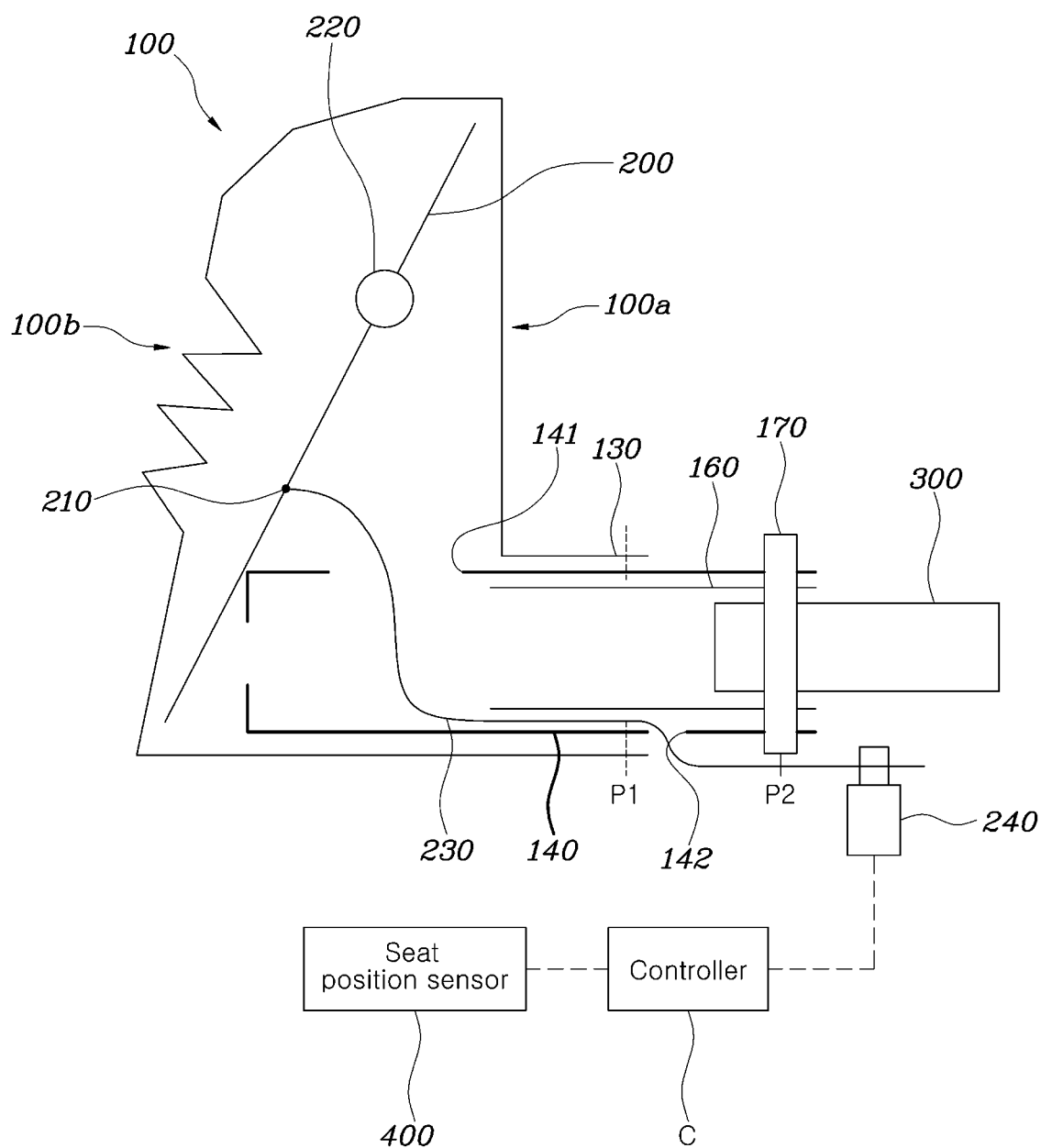
FIG. 10 is a view for explaining an operation of closing the active vent and supplying gas into the first chamber according to an embodiment of the present disclosure.
Figure 11:
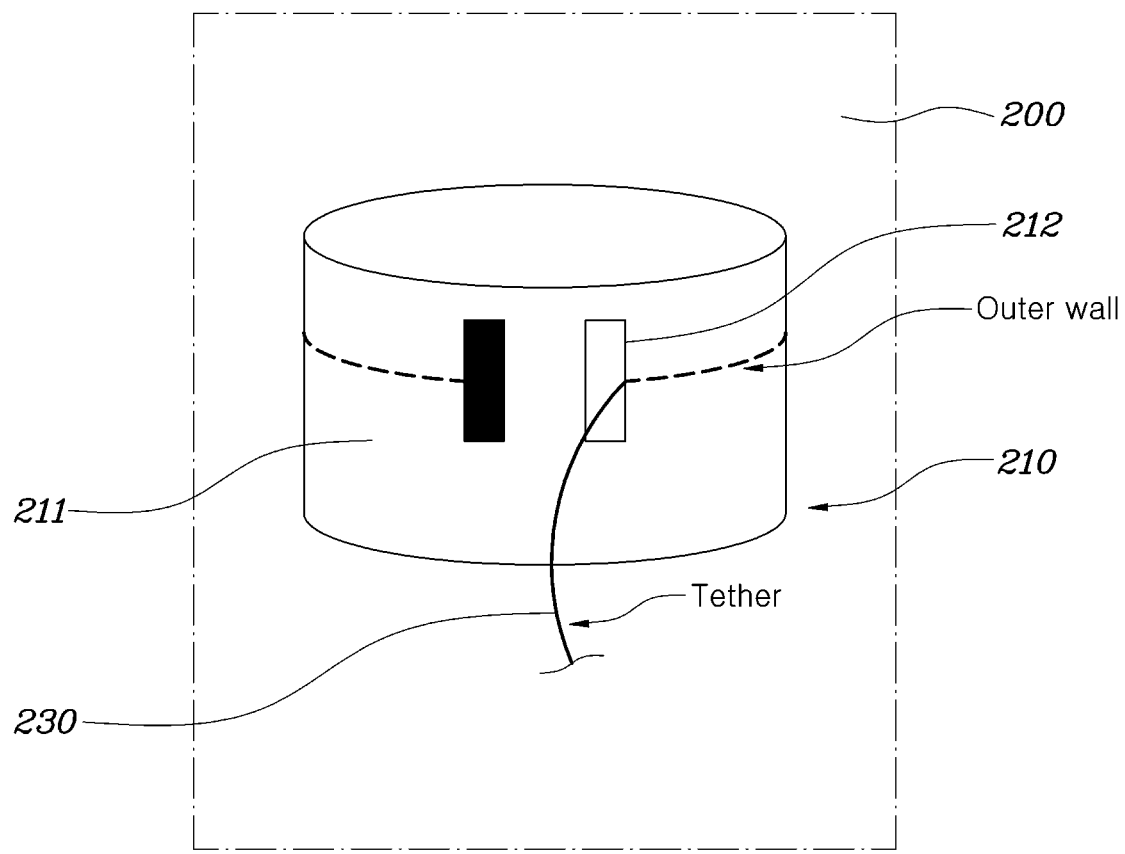
FIG. 11 is a view illustrating a shape in which a tether is wound around an active vent according to an embodiment of the present disclosure.

With reference to FIGS. 9 to 11, the deployment adjustment device includes the active vent 210 formed in a hole shape in the diaphragm 200, the tether 230 having one end connected to the active vent 210, the tether 230 being configured to close the active vent 210 when tension is applied to the tether 230 as the tether 230 is pulled in a direction in which the airbag cushion 100 is deployed when the airbag cushion 100 is deployed, an active actuator 240 connected to the other end of the tether 230 and configured to apply tension to the tether 230 and eliminate the tension by operating to be disconnected from the tether 230, and the controller C configured to perform control to selectively operate the active actuator 240 in accordance with the seat position.

For example, a single inflator 300 may be connected to the diffuser 140.

Further, the discharge port 141 provided in the diffuser 140 is directed toward the airbag cushion 100, and the discharge port 141 is provided to communicate with the first chamber 100a.

Therefore, the gas generated by the inflator 300 is moved to the diffuser 140 and supplied into the first chamber 100a through the discharge port 141 provided in the diffuser 140.

In particular, the active vent 210 may be formed in the diaphragm 200, and a typical vent 220 may be additionally formed in a portion of the diaphragm 200 positioned above the active vent 210.

Further, one end of the tether 230 may be connected to the active vent 210, and the other end of the tether 230 may be caught, in a ring shape or the like, by the active actuator 240. In this case, the tether 230 may pass through the discharge port 141 of the diffuser 140 and be connected to the active vent 210 and the active actuator 240.

Further, the active actuator 240 may operate to maintain the state in which the other end of the tether 230 is caught, or the active actuator 240 may operate to release the tether 230.

That is, the gas may be supplied into the first chamber 100a in a state in which the active vent 210 is closed as tension is applied to the tether 230 depending on whether the active actuator 240 operates. Alternatively, the gas may be supplied into the first chamber 100a in a state in which the active vent 210 is opened as no tension is applied to the tether 230.

Therefore, the active actuator 240 may selectively operate in accordance with the seat arrangement to adjust the operation of deploying the first chamber 100a and the second chamber 100b.

Further, in embodiments of the present disclosure, the tether 230 may be wound around a rim of the active vent 210, and the tension applied by the tether 230 may allow the tether 230 to tighten the rim of the active vent 210 to close the active vent 210.

With reference to FIGS. 10 and 11, the tether 230 is wound around an outer wall 211, which defines the hole in the active vent 210, and sewed along a periphery of the outer wall 211 in a state in which one end of the tether 230 is fixed to the outer wall 211. Further, the tether 230 wound around the outer wall 211 exits through a passing hole 212 formed in the outer wall 211, thereby constituting the active vent 210.

Therefore, when the active vent 210 is moved away from the active actuator 240 by pressure of the gas that deploys the airbag cushion 100, the tether 230 is pulled, and tension is applied to the tether 230, such that the tether 230 wound around the outer wall 211 tightens the outer wall 211 and closes the active vent 210.

Further, in embodiments of the present disclosure, the diffuser 140 may be fixed to the inner surface of the gas inlet port 130 of the airbag cushion 100, a heat shield 160 may be fixed to an inner surface of the diffuser 140, a slit 142 may be formed in the diffuser 140 overlapping the heat shield 160, and the tether 230 may be connected by passing through a portion between the heat shield 160 and the diffuser 140 and passing through the slit 142.

Figure 12:
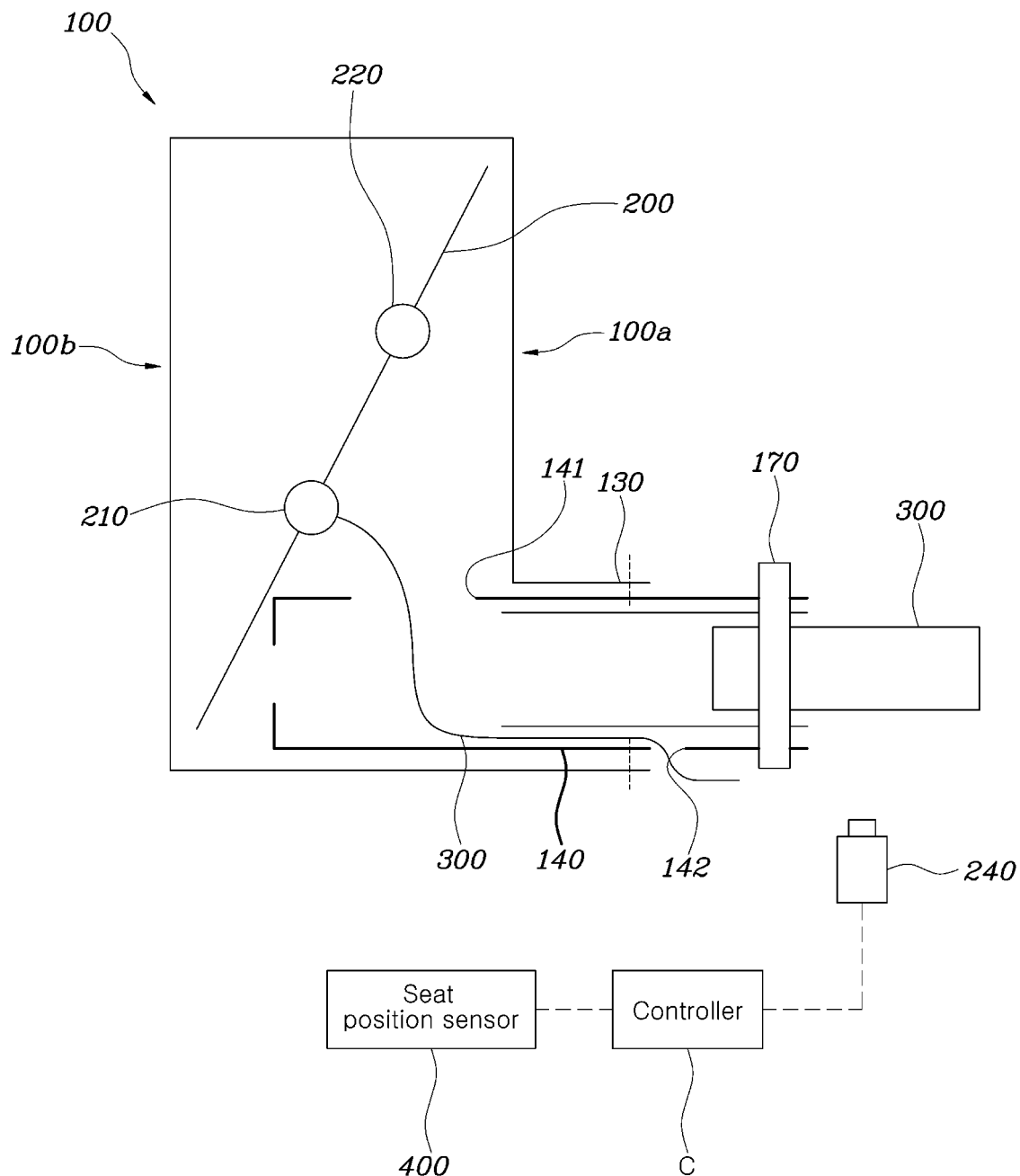
FIG. 12 is a view for explaining an operation of opening the active vent and supplying gas into the first and second chambers according to an embodiment of the present disclosure.

With reference to FIGS. 10 and 12, the slit 142 is formed in the diffuser 140, and the heat shield 160 is fixed to the diffuser 140 while having a shape that closes the slit 142 in the inner surface of the diffuser 140.

Therefore, the tether 230 connected to the active vent 210 passes through a portion between the slit 142 and the heat shield 160, exits to the outside of the diffuser 140 through the slit 142, and is connected to the active actuator 240.

That is, because the heat shield 160 closes the slit 142, a route along which the gas of the inflator 300 moves to the slit 142 is formed complicatedly.

Therefore, even though the tether 230 passes through the slit 142, a leak of gas through the slit 142 is minimized.

Further, a distance between the end of the heat shield 160 and the slit 142 may be equal to or longer than a predetermined length.

Further, the inflator 300, the heat shield 160, and the diffuser 140 are bound by the fastener 170. The slit 142 may be formed between a fixing point P1, at which the gas inlet port 130 and the diffuser 140 are fixed, and a binding point P2 of the fastener 170. The fastener 170 may be a clamp.

For example, a distance between the slit 142 and the end of the heat shield 160 is at least 10 mm or more.

Further, because the slit 142 is formed in a section between the point at which the airbag cushion 100 and the diffuser 140 are sewed and the point at which the clamp is fastened, the route, along which the gas of the inflator 300 moves to the slit 142, may be formed to be as long as possible, thereby minimizing a leak of gas.

Further, in response to a signal from the seat position sensor 400, the controller C may perform control not to operate the active actuator 240 when the leg protection condition for the passenger is satisfied, and the controller C may perform control to operate the active actuator 240 when the head protection condition for the passenger is satisfied.

First, in the seat arrangement in the opposite-seating state in which the passengers face each other, the active actuator 240 does not operate, as illustrated in FIG. 10, such that the tether 230 is kept in the fixed state.

Therefore, when the first chamber 100a is inflated by being filled with the gas provided from the inflator 300, the distance between the active vent 210 and the active actuator 240 increases, such that tension is applied to the tether 230, and the active vent 210 is closed in this process.

Therefore, the amount of gas transferred from the first chamber 100a to the second chamber 100b decreases, such that the first chamber 100a is inflated and deployed prior to the second chamber 100b. Particularly, the lower end of the first chamber 100a is deployed in a shape widened toward the front side of the passenger, such that the first support part 110 of the first chamber 100a is supported on the passenger's thighs and stably restrains the passenger's upper body.

Further, in the seat arrangement in which the passenger faces the structure of the vehicle such as the partition wall, the active actuator 240 operates, as illustrated in FIG. 12, such that the tether 230 is unfixed.

Therefore, when the first chamber 100a is inflated by being filled with the gas provided from the inflator 300, no tension is applied to the tether 230, and the tether 230 cannot pull the active vent 210, such that the second chamber is filled with the gas in the state in which the active vent 210 is opened.

Therefore, the amount of the gas transferred from the first chamber 100a to the second chamber 100b increases, such that the second chamber 100b is easily inflated. Particularly, the upper end of the second chamber 100b is deployed in a shape widened toward the passenger's head, such that the passenger's head is supported on the second support part 120 of the second chamber 100b, and the passenger's head is safely protected.

Meanwhile, as a third embodiment of the deployment adjustment device, the operation of deploying the first chamber 100a and the second chamber 100b may be adjusted by a change in marginal length of the tether 230.

Figure 13:
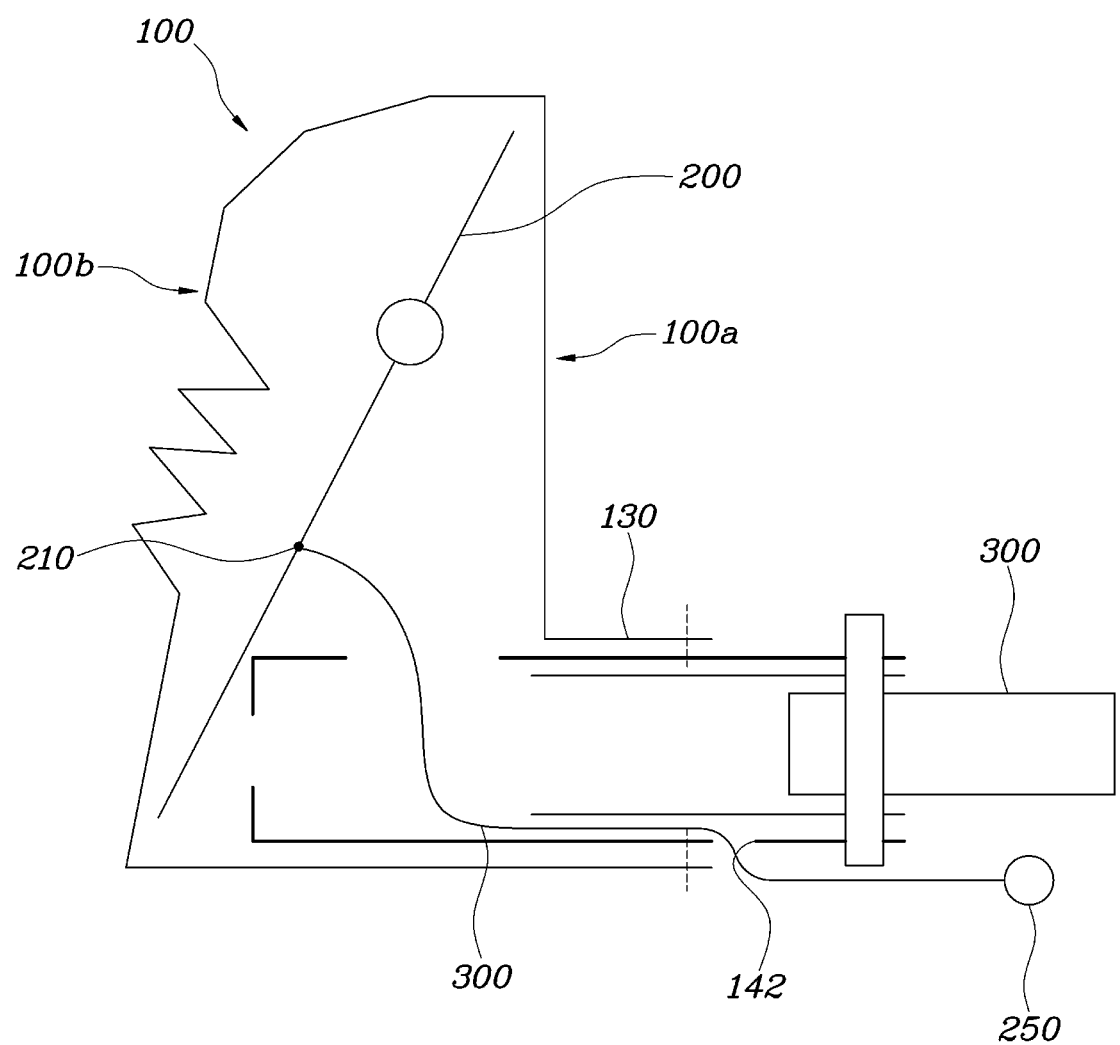
FIG. 13 is a view illustrating a structure in which the tether is fixed to a tether fixing part according to an embodiment of the present disclosure.
Figure 14:
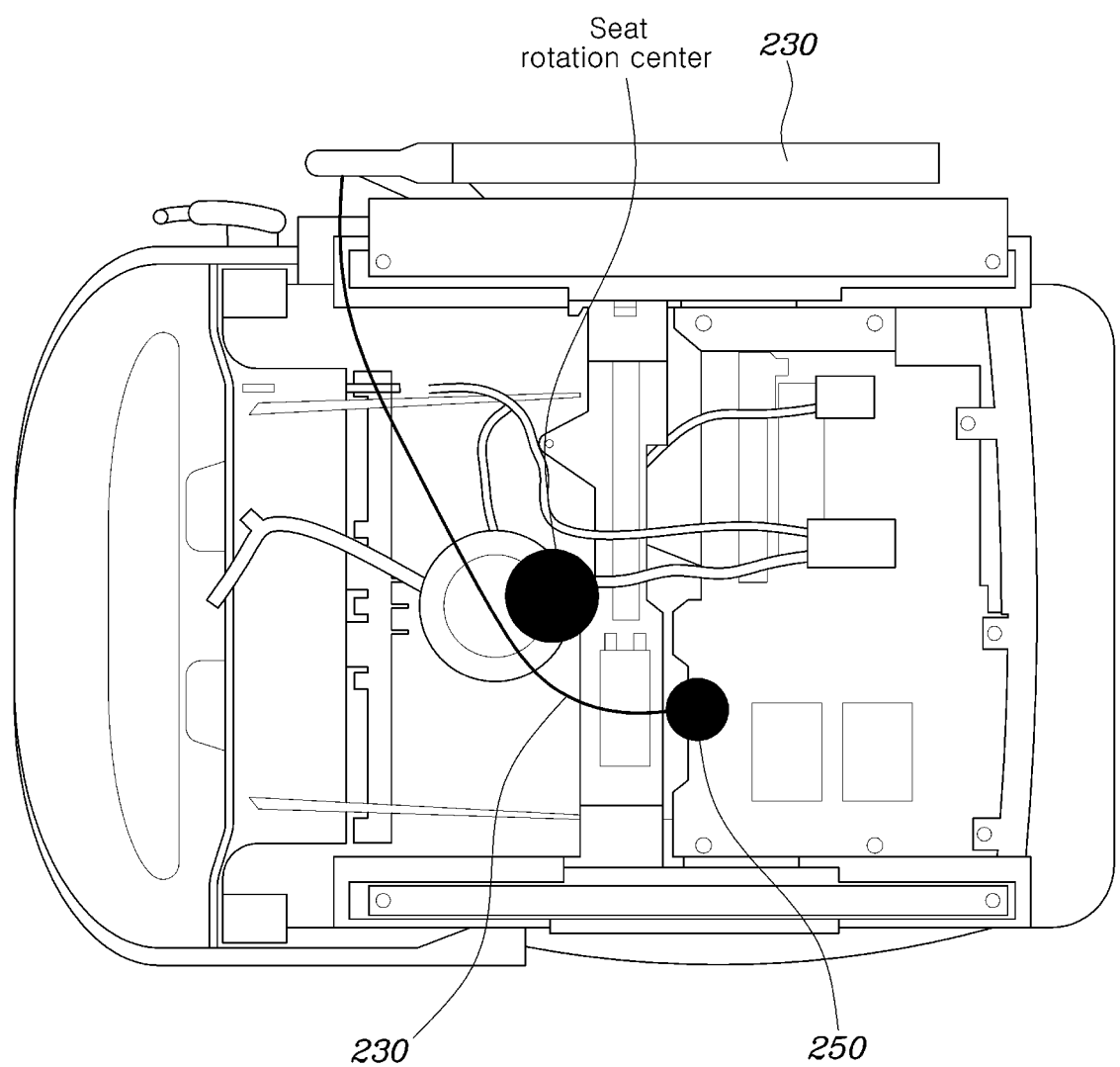
FIG. 14 is a view illustrating a length of the tether at the time of switching to a seat arrangement that satisfies a leg protection condition for the passenger in an embodiment of the present disclosure.
Figure 15:
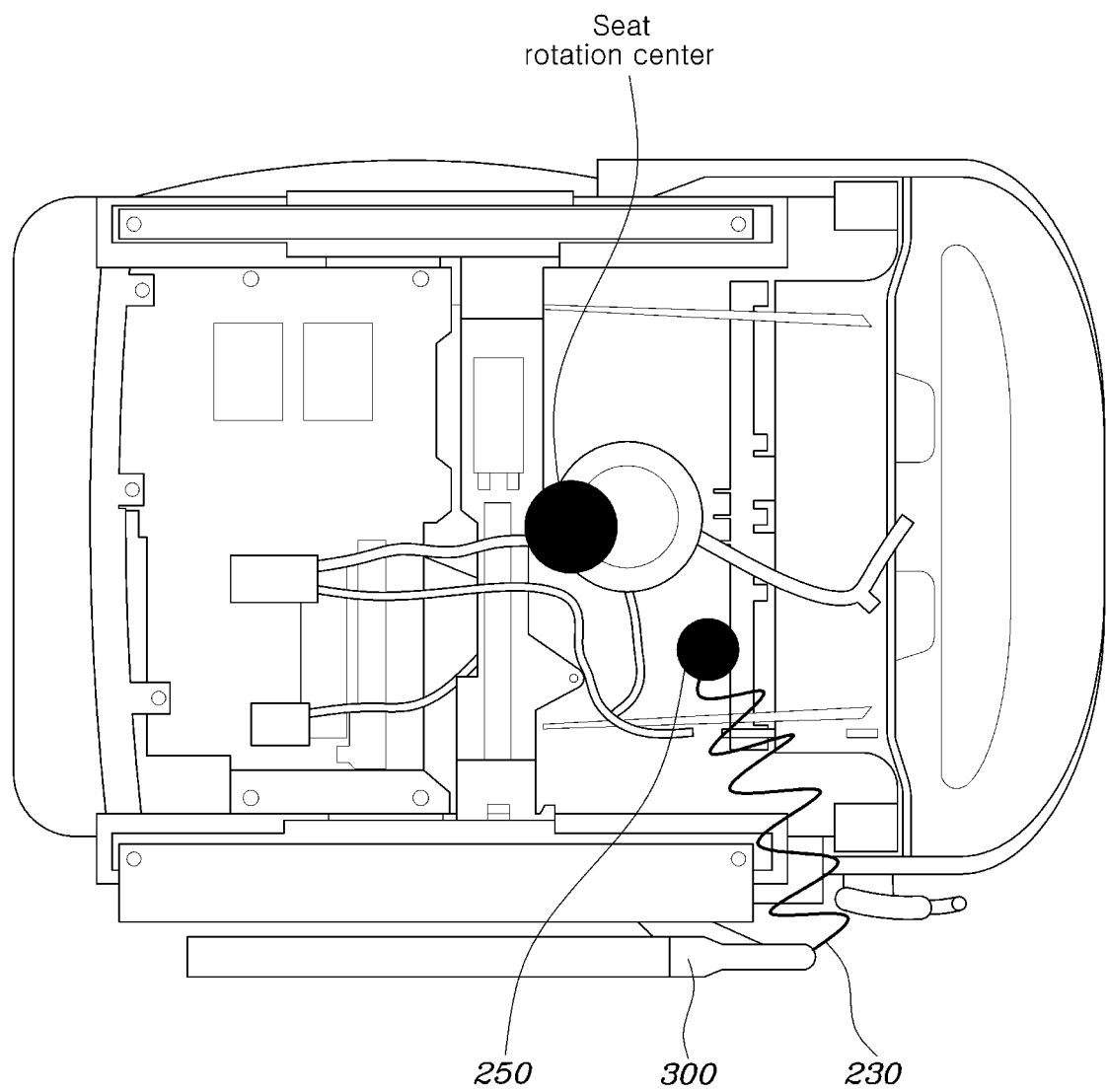
FIG. 15 is a view illustrating a length of the tether at the time of switching to a seat arrangement that satisfies a head protection condition for the passenger in an embodiment of the present disclosure.

With reference to FIGS. 13 to 15, the deployment adjustment device includes the active vent 210 formed in a hole shape in the diaphragm 200, the tether 230 having one end connected to the active vent 210, the tether 230 being configured to be pulled in the direction in which the airbag cushion 100 is deployed when the airbag cushion 100 is deployed, and a tether fixing part 250 to which the other end of the tether 230 is fixed at ordinary times, the tether fixing part 250 being configured not to be changed in position when the seat arrangement is changed. The marginal length of the tether 230 extending from the tether fixing part 250 to the active vent 210 may be a length by which the tether 230 is pulled to close the active vent 210 at the time of switching to the seat arrangement that satisfies the leg protection condition for the passenger. The marginal length of the tether 230 may be a length by which the open state of the active vent 210 is maintained even though the tether 230 is pulled at the time of switching to the seat arrangement that satisfies the head protection condition for the passenger.

That is, in FIG. 10, the active actuator 240 is used to release the tether 230. However, in FIG. 13, the tether fixing part 250 is used instead of the active actuator 240 so that the other end of the tether 230 is kept fixed to the tether fixing part 250 at ordinary times.

Further, a rotation center is defined on the seat and serves as a rotation criterion, and the seat always rotates about the rotation center.

The tether fixing part 250 exists at a particular position based on the rotation center of the seat. The rotation center of the seat and the position of the tether fixing part 250 are not changed when the seat rotates, such that a positional relationship between the tether fixing part 250 and the rotation center of the seat is fixed.

For reference, even though the position of the seat is changed forward and rearward or leftward and rightward, the seat moves in the state in which the positional relationship between the rotation center and the tether fixing part 250 is maintained.

Therefore, as illustrated in FIGS. 14 and 15, in case that the seat rotates and switches to a state in which the seat faces the front side of the vehicle or a state in which the seat faces the rear side of the vehicle, the position of the tether fixing part 250, to which the other end of the tether 230 is fixed, is not changed, but the position of one end of the tether 230 connected to the inflator 300 is changed, such that the length of the tether 230 extending from the tether fixing part 250 to the active vent 210 varies.

Therefore, in accordance with the seat arrangement implemented by the rotation of the seat, the airbag cushion 100 is coupled when the active vent 210 is in the open or closed state, such that the operation of deploying the first chamber 100a and the second chamber 100b may be adjusted.

More specifically, as illustrated in FIG. 14, in the seat arrangement in the opposite-seating state in which the passengers face each other, the length of the tether 230 is not sufficiently long because the marginal length of the tether 230 extending from the tether fixing part 250 to the active vent 210 is relatively short.

Therefore, when the first chamber 100a is inflated by being filled with the gas provided from the inflator 300, the distance between the active vent 210 and the tether fixing part 250 is long, such that tension is applied to the tether 230, and in this process, the active vent 210 is closed.

Therefore, the amount of gas transferred from the first chamber 100a to the second chamber 100b decreases, such that the first chamber 100a is inflated and deployed prior to the second chamber 100b. Particularly, the lower end of the first chamber 100a is deployed in a shape widened toward the front side of the passenger, such that the first support part 110 of the first chamber 100a is supported on the passenger's thighs and stably restrains the passenger's upper body.

Further, as illustrated in FIG. 15, in the seat arrangement in which the passenger faces the structure of the vehicle such as the partition wall, the length of the tether 230 is sufficiently long because the marginal length of the tether 230 extending from the tether fixing part 250 to the active vent 210 is relatively long.

Therefore, when the first chamber 100a is inflated by being filled with the gas provided from the inflator 300, no tension is applied to the tether 230 because the distance between the active vent 210 and the tether fixing part 250 is short, such that the tether 230 cannot pull or tighten the active vent 210, and the second chamber is filled with the gas in the state in which the active vent 210 is opened.

Therefore, the amount of the gas transferred from the first chamber 100a to the second chamber 100b increases, such that the second chamber 100b is easily inflated. Particularly, the upper end of the second chamber 100b is deployed in a shape widened toward the passenger's head, such that the passenger's head is supported on the second support part 120 of the second chamber 100b, and the passenger's head is safely protected.

According to embodiments of the present disclosure described above, the airbag cushion 100 is deployed while varying whether to deploy the first chamber 100a and the second chamber 100b and the deployment timing of the first chamber 100a and the second chamber 100b, which are divided based on the forward/rearward direction of the airbag cushion 100, depending on the seat arrangement. Therefore, the airbag cushion 100 may be deployed in a shape optimized for a collision situation, and the passenger protection region may be stably ensured regardless of the seating types of the passengers and the types of passengers.

Moreover, the lower end of the first chamber 100a is deployed in a shape widened toward the front side of the passenger, such that the airbag cushion 100 is supported on the passenger's thighs, and the passenger's upper body is stably restrained. In addition, the upper end of the second chamber 100b is deployed in a shape widened toward the passenger, such that the range in which the passenger's head is supported is increased, and the passenger is safely protected.

While embodiments of the present disclosure have been described with reference to the specific examples, it is apparent to those skilled in the art that various modifications and alterations may be made within the technical spirit of the present disclosure, and these modifications and alterations belong to the appended claims.

What is claimed is:

1. A seatbelt airbag comprising:
   a diaphragm configured to divide an internal space of an airbag cushion in a deployed state into a first chamber and a second chamber, the airbag cushion being configured to be deployed from a seatbelt;
   a first support part disposed at a lower side of the first chamber, wherein the first support part has a first shape that widens toward a front side of a passenger and is configured to be supported on thighs of the passenger;
   a second support part disposed at an upper side of the second chamber, wherein the second support part has a second shape that widens toward the passenger and is configured to support a head of the passenger; and
   a deployment adjustment device configured to adjust an operation of deploying the first chamber and the second chamber in accordance with a seat arrangement.

2. The seatbelt airbag of claim 1, wherein the first support part is disposed such that a bottom surface of the first chamber is widened leftward and rightward toward the front side of the passenger in a passenger direction.

3. The seatbelt airbag of claim 1, wherein the second support part is disposed such that an upper surface of the second chamber is widened leftward and rightward toward the passenger from a location in front of the passenger.

4. The seatbelt airbag of claim 1, wherein the diaphragm is configured to divide the internal space in an oblique shape between a front end of the first support part and a rear end of the second support part.

5. The seatbelt airbag of claim 4, wherein a portion between the diaphragm and the front end of the first support part and a portion between the diaphragm and the rear end of the second support part are configured such that a flow rate of gas passing therethrough is less than a predetermined flow rate.

6. The seatbelt airbag of claim 1, wherein two opposite sides of the diaphragm are fixed to edges at which rear lateral regions extending upward from two opposite sides of the first support part meet front lateral regions extending downward from two opposite sides of the second support part.

7. The seatbelt airbag of claim 1, wherein the deployment adjustment device comprises:
   first and second inflators configured to independently supply gas into the first and second chambers; and
   a controller configured to perform control to selectively operate the first and second inflators in accordance with a seat position.

8. The seatbelt airbag of claim 7, further comprising:
   a diffuser disposed in a gas inlet port of the airbag cushion, wherein the diffuser is in communication with the first chamber, and wherein the diffuser is configured to introduce the gas of the first inflator into the first chamber; and
   a gas hose disposed in the gas inlet port of the airbag cushion, wherein the gas hose is in communication with the second chamber, and wherein the gas hose is configured to introduce the gas of the second inflator into the second chamber.

9. The seatbelt airbag of claim 8, further comprising a discharge port disposed in the diffuser, wherein the discharge port is in communication with the first chamber, and wherein the gas hose penetrates the diffuser and is connected to communicate with the second chamber.

10. The seatbelt airbag of claim 7, wherein in response to a signal from a seat position sensor, the controller is configured to perform control to operate the first inflator in a state in which a leg protection condition for the passenger is satisfied and to perform control to operate the second inflator in a state in which a head protection condition for the passenger is satisfied.

11. A seatbelt airbag comprising:
a diaphragm configured to divide an internal space of an airbag cushion in a deployed state into a first chamber and a second chamber, the airbag cushion being configured to be deployed from a seatbelt;
a first support part disposed at a lower side of the first chamber, wherein the first support part has a first shape that widens toward a front side of a passenger and is configured to be supported on thighs of the passenger;
a second support part disposed at an upper side of the second chamber, wherein the second support part has a second shape that widens toward the passenger and is configured to support a head of the passenger; and
a deployment adjustment device configured to adjust an operation of deploying the first chamber and the second chamber in accordance with a seat arrangement, the deployment adjustment device comprising:
an active vent having a hole shape disposed in the diaphragm;
a tether having a first end connected to the active vent, the tether being configured to close the active vent in a state in which tension is applied as the tether is pulled in a direction in which the airbag cushion is deployed in a case in which the airbag cushion is deployed;
an active actuator connected to a second end of the tether and configured to apply the tension to the tether and to eliminate the tension by operating to be disconnected from the tether; and
a controller configured to perform control to selectively operate the active actuator in accordance with a seat position.

12. The seatbelt airbag of claim 11, wherein the tether is wound around a rim of the active vent, and wherein the tether is configured such that the tension applied to the tether allows the tether to tighten the rim of the active vent to close the active vent.

13. The seatbelt airbag of claim 11, further comprising:
a diffuser fixed to an inner surface of a gas inlet port of the airbag cushion;
a heat shield fixed to an inner surface of the diffuser; and
a slit disposed in the diffuser overlapping the heat shield, wherein the tether is connected by passing through a portion between the heat shield and the diffuser and passing through the slit.

14. The seatbelt airbag of claim 13, wherein a distance between an end of the heat shield and the slit is equal to or longer than a predetermined length.

15. The seatbelt airbag of claim 13, further comprising an inflator, wherein the inflator, the heat shield, and the diffuser are bound by a fastener, and the slit is disposed between a fixing point at which the gas inlet port and the diffuser are fixed and a binding point of the fastener.

16. The seatbelt airbag of claim 11, wherein in response to a signal of a seat position sensor, the controller is configured to perform control not to operate the active actuator in a state in which a leg protection condition for the passenger is satisfied and to perform control to operate the active actuator in a state in which a head protection condition for the passenger is satisfied.

17. A seatbelt airbag comprising:
a diaphragm configured to divide an internal space of an airbag cushion in a deployed state into a first chamber and a second chamber, the airbag cushion being configured to be deployed from a seatbelt;
a first support part disposed at a lower side of the first chamber, wherein the first support part has a first shape that widens toward a front side of a passenger and is configured to be supported on thighs of the passenger;
a second support part disposed at an upper side of the second chamber, wherein the second support part has a second shape that widens toward the passenger and is configured to support a head of the passenger; and
a deployment adjustment device configured to adjust an operation of deploying the first chamber and the second chamber in accordance with a seat arrangement, the deployment adjustment device comprising:
an active vent having a hole shape disposed in the diaphragm;
a tether having a first end connected to the active vent, the tether being configured to be pulled in a direction in which the airbag cushion is deployed in a case in which the airbag cushion is deployed; and
a tether fixing part to which a second end of the tether is normally fixed, the tether fixing part being configured not to be changed in position in a state in which the seat arrangement is changed;
wherein a marginal length of the tether extending from the tether fixing part to the active vent is a length by which the tether is pulled to close the active vent at a time of switching to a first seat arrangement that satisfies a leg protection condition for the passenger; and
wherein the marginal length of the tether is a length by which an open state of the active vent is maintained even though the tether is pulled at the time of switching to a second seat arrangement that satisfies a head protection condition for the passenger.

18. The seatbelt airbag of claim 17, wherein the first support part is disposed such that a bottom surface of the first chamber is widened leftward and rightward toward the front side of the passenger in a passenger direction.

19. The seatbelt airbag of claim 17, wherein the second support part is disposed such that an upper surface of the second chamber is widened leftward and rightward toward the passenger from a location in front of the passenger.

20. The seatbelt airbag of claim 17, wherein the diaphragm is configured to divide the internal space in an oblique shape between a front end of the first support part and a rear end of the second support part.

* * * * *